# 3,074,998
ENOL CARBAMATES
Richard R. Whetstone and Jerome G. Kuderna, Modesto, Calif., assignors to Shell Oil Company, a corporation of Delaware
No Drawing. Filed Dec. 10, 1959, Ser. No. 858,610
8 Claims. (Cl. 260—482)

This invention relates to a new class of compounds which are of substantial interest and utility for a wide variety of agricultural applications. Generically speaking, the new compounds are the enol esters of carbamic acids—that is, the esters of carbamic acid with the enol form of compounds containing a keto group bonded to a carbon atom which also is bonded to an active hydrogen atom. The new esters have exhibited a wide spectrum of biological activity, many being selective or non-selective herbicides suitable for either or both pre-emergence and post-emergence applications; certain of the esters are effective insecticides, particularly for destruction of flies, mosquitoes, gnats and other insect pests found in and around barnyards, stables, milking sheds, and the like, and certain of the esters are effective fungicides.

The new compounds are esters of carbamic acids and the enol form of ketones in which the carbonyl carbon atom of the ketone group is bonded directly to a carbon atom which also is bonded to an active hydrogen atom. Preferred of the new compounds are those which are the esters of the enol form of ketones in which the ketone group is bonded to a carbon bonded to a hydrogen atom which is activated by the adjacent presence of another carbonyl group, the other carbonyl group being part of an aldehyde group, a ketone (i.e., acyl) group, or a carboxyl group, or by the adjacent presence of a group which can be hydrolyzed to a carboxyl group, inasmuch as these new compounds have exhibited the most desirable properties as candidate agricultural chemicals. These preferred compounds can be represented by the formula:

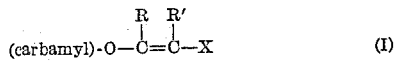      (I)

wherein "carbamyl" represents the acyl moiety of a carbamic acid, including carbamic acid, N-substituted carbamic acids, and N,N-disubstituted carbamic acids as set out hereinafter, R represents an organic group, R' represents hydrogen or an organic group (which may be the same or different from the organic group represented by R), and X represents a carbonyl group or a group which can be hydrolyzed to a carboxyl group, as set out above.

Certain subgenera of the new compounds are of particular interest:

I. Esters of carbamic acids with the enol form of beta-dicarbonyl compounds containing an active alpha hydrogen atom, these esters being characterized by the structural configuration

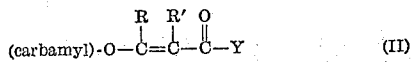      (II)

wherein Y is hydrogen, hydroxy, or a functional substitute for hydroxy and which may be hydrolyzed to hydroxy, and the other symbols have the respective meanings already set out.

a. Esters of the enol forms of beta-ketoaldehydes having an active alpha hydrogen atom, these esters being described by the formula:

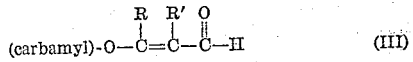      (III)

wherein the symbols have their previously designated respective meanings.

b. Esters of the enol forms of beta-diketones having an active hydrogen atom, these esters being described by the formula:

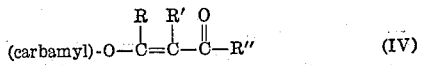      (IV)

wherein R" represents an organo group and the other symbols have their previously designated respective meanings.

c. Esters of the enol forms of beta-ketocarboxylic acids having an active alpha hydrogen atom, and the functional derivatives thereof, these esters being described by the formula:

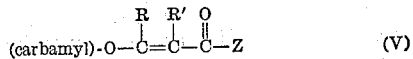      (V)

wherein Z is hydroxy or a functional substitute therefor which can be hydrolyzed to hydroxy, and the other symbols have their previously designated respective meanings. The preferred esters are those of the enol forms of esters of beta-ketocarboxylic acids having an active hydrogen atom—i.e., Z is organo-oxy, or $R^x$—O—)—and of the enol forms of amides of beta-ketocarboxylic acids—i.e., Z is amino, or $(R^o)_2N$—, $R^o$ representing hydrogen or an organo group.

II. Those having the structure of esters of carbamic acids of the enol form of ketones in which the keto group is bonded to a carbon atom containing at least one hydrogen atom, this latter carbon atom also being bonded to a group which can be hydrolyzed to a carboxyl group. The preferred members of this subgenus are those wherein the group which can be hydrolyzed to a carboxyl group is the cyanide group, —C≡N, these preferred members being described by the formula:

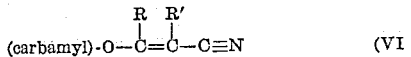      (VI)

wherein the symbols have the respective meanings already set out herein.

It is to be understood that the symbols R and R' together can represent a single divalent group joining together the indicated carbon atoms in a ring, and that the symbols R and R" together can represent a single divalent group joining together the indicated carbon atoms in a ring, and that the groups R' and R" together can represent a single divalent group joining together the indicated carbon atoms in a ring.

The compounds of the invention can be considered to be esters of carbamic acids, which acids can be described by the formula:

      (VII)

wherein $R^o$ represents hydrogen or an organic group. Thus, the new compounds include the enol esters of carbamic acid itself (both of $R^o$ are hydrogen), of mono-organic carbamic acids (one of $R^o$ is hydrogen, one is organo), one of di-organo carbamic acids (both of $R^o$ are organo). Also included are the new compounds wherein both of $R^o$ together represent a single divalent group, which, together with the indicated nitrogen atom, forms a heterocyclic ring.

Referring to the foregoing Formulas I through VII, the organic groups represented by the symbols R, R', R", $R^x$ and $R^o$, respectively, preferably are hydrocarbon or substituted hydrocarbon, and the compounds of greatest interest are those wherein each of the organic groups represented by these symbols are lower molecular weight hydrocarbon groups—i.e., hydrocarbon groups containing not more than about 10 carbon atoms each. Such hydrocarbon groups may be of either aliphatic or cyclic configuration; they may be saturated, olefinically unsaturated or aromatically unsaturated; preferably they are free from acetylenic unsaturation. The aliphatic groups may be of straight-chain, or of branched-chain configuration. The aromatic groups preferably are mononuclear. Thus, suitable organic groups include both straight-chain and branched-chain alkyl, such as methyl, ethyl, n- and isopropyl, n-, sec-, and tert-butyl, the various isomeric $C_5$, $C_6$ and like alkyl groups, cycloalkyl, such as the cyclopentyl, cyclohexyl, methylcyclohexyl, dimethylcyclooctyl, 3,5,5-trimethylcyclohexyl, and like cycloalkyl groups, aryl, such as the phenyl group, alkaryl, such as the methylphenyl, ethylphenyl and like alkaryl groups, aralkyl, such as the benzyl, phenethyl and like aralkyl groups, alkenyl, such as the allyl, crotyl and like groups, alkadienyl, such as the butadienyl, pentadienyl and like alkadienyl groups, and mixed groups such as the vinylphenyl, allylphenyl, phenylvinyl, phenylcrotyl, phenylallyl groups, and the like. Of the substituted hydrocarbon groups, those set out above which are substituted by one or more of halogen, cyano and nitro, are preferred. Because of their properties as potentially useful insecticides, the compounds wherein the symbols R', R" and R° represent hydrogen, phenyl or alkyl of from 1 to 6 carbon atoms, and the symbols R and R$^x$ represent phenyl or alkyl of from 1 to 6 carbon atoms, are preferred. In those compounds wherein the groups R° together represent a single divalent group, it is preferred that the group be an alkylene group of from 1 to 6 carbon atoms. In those compounds wherein the symbols R and R' and/or the symbols R and R" and/or the symbols R' and R" respectively together represent single divalent groups, it is preferred that the divalent groups be alkylene of up to six carbon atoms.

Typical species of these new compounds include, for example, the following: methyl 3-(dimethylcarbamyloxy)crotonate; carbamic acid, dimethyl-, 1-methyl-3-oxo-1-butenyl ester; benzyl 3-(dimethylcarbamyloxy)crotonate; ethyl 3-(dimethylcarbamyloxy)crotonate; N,N-dimethyl-3 - (dimethylcarbamyloxyl)crotonamide; ethyl 3-(dimethylcarbamyloxy)cinnamate; ethyl beta-(dimethylcarbamyloxy)-p-nitrocinnamate; beta-(dimethylcarbamyloxy)cinnamonitrile; methyl beta-(dimethylcarbamyloxy)-cinnamate; 3-(dimethylcarbamyloxy) - 2 - phenylcrotononitrile; ethyl 2-(dimethylcarbamyloxy)-1-cyclopentene-1-carboxylate; 2-(dimethylcarbamyloxy)-3-methyl-2-cyclopentene-1-one; isopropyl 3-(ethylcarbamyloxy)crotonate; butyl beta-(carbamyloxy)-cinnamate.

It will be noted that although the compounds of this invention are referred to as esters of carbamic acids and enols, the designation is one based upon their structure, and not upon the manner in which they are or may be prepared. Although characterized as esters, the compounds of this invention need not be prepared by direct esterification of the carbamic acid by the enol. In fact, in most cases other methods will be found more convenient and/or effective for their preparation.

The new enol carbamates are conveniently prepared by reacting the enol with the appropriate carbamyl halide, preferably chloride, in the presence of a hydrogen halide acceptor. While any of the usual hydrogen halide acceptors can be used, preferably a tertiary amine is used for the purpose, since the tertiary amines are substantially inert in the reaction mixture. Of particular convenience are the heterocyclic amines, such as pyridine. The reaction ordinarily is conducted at a temperature of from about 0° C. to about 100° C., it usually being most desirable to mix the reactants and the hydrogen halide acceptor at about room temperature, then heating the mixture at a somewhat higher temperature—say, from about 50° C. to about 85° C.—for a sufficient time to insure completion of the reaction. Usually about stoichiometric quantities of the reactants and hydrogen halide acceptor are used, although a slight to moderate excess of the carbamyl halide usually can be used to advantage to insure more complete reaction. The enol carbamate product can be recovered by usual recovery procedures. In most cases, recovery is conveniently effected by extraction of the reaction mixture with a suitable solvent, such as an ether, removal of the solvent, and distillation of the residue from the extraction.

The folowing examples illustrate preparation of typical species of the enol carbamates of this invention. In these examples, "parts" means parts by weight unless otherwise expressly stated, and parts by weight bear the same relation to parts by volume as does the kilogram to the liter.

*Example I.—Preparation of Methyl 3-(Dimethylcarbamyloxy)Crotonate*

EXPERIMENT I 11.6 parts of methyl acetoacetate were dissolved in 15.8 parts of pyridine, and the solution at 30° C. was mixed with 16.1 parts of dimethylcarbamyl chloride. Mole ratio: 1/2/1.5. The temperature of the mixture rose to 45° C. The mixture was thoroughly stirred and allowed to stand overnight. Then the mixture was repeatedly extracted with ether, then the ether was removed to yield an amber liquid which was Claisen distilled to give a product boiling at 80–81° C. at 0.08 millimeter mercury pressure.

Analysis of the product gave: C, 50.0%; H, 7.5%; N, 7.0%. The calculated analysis of methyl 3-(dimethylcarbamyloxy)crotonate is: C, 51.0%; H, 7.0%; N, 7.5%. Infrared analysis confirmed that the product was methyl 3-(dimethylcarbamyloxy)crotonate.

EXPERIMENT II

The same product also was obtained by the following procedure: 84 parts of dimethyl carbamyl chloride was mixed with a solution of 92 parts of methyl acetoacetate in 79 parts of pyridine. The mixture was stirred and allowed to stand for two hours. A readily liquid upper phase was decanted from a lower gum-like phase, then the gum was extracted with ether. The ether was removed from the extract to give an amber oil. This was stripped at 47–55° C. at about 1 millimeter mercury pressure, and the residue fractionated to yield a product boiling at 100–102° C. at 1 millimeter mercury pressure. Analysis of the product identified it as methyl 3-(dimethylcarbamyloxy)crotonate.

*Example II.—Preparation of Benzyl 3-(Dimethylcarbamyloxy)Crotonate*

81 parts of dimethylcarbamyl chloride was added to an ice-cold solution of 96 parts of benzyl acetoacetate in 79 parts of anhydrous pyridine. Mole ratio: 1/0.68/1.33. The mixture was held at room temperature (35° C.) for 48 hours. The mixture then was extracted several times with cold ether and the ether removed from the extract. Vacuum distillation of the extracted material gave 22 parts of benzyl 3-(dimethylcarbamyloxy)crotonate, boiling at 168–176° C. at 0.3 millimeter mercury pressure. Analysis: found C, 63.7%; H, 6.5%; N, 5.1%. The calculated analysis for benzyl 3-(dimethylcarbamyloxy) crotonate is: C, 63.8%; H, 6.5%; N, 5.3%.

*Example III.—Preparation of Carbamic Acid, Dimethyl-, 1-Methyl-3-Oxo-1-Butenyl Ester*

107.5 parts of dimethyl carbamyl chloride was added to a solution of 110 parts of acetylacetone in 103 parts pyridine, the solution being at 30° C. Mole ratio: 1:1.1:1.3. The mixture then was warmed on a steam bath for 30 minutes to achieve fluidity and then cooled to about 35° C. The mixture then was extracted three times with ether and a black gummy residue discarded. The ether was partially removed from the extract, and the remaining solution allowed to stand for three days. An additional amount of gum precipiated and was discarded to give 120 parts of solution. This was distilled at 40–50° C. under a pressure of about 1 millimeter mercury pressure to give 26 parts of a residue which was fractionally distilled. The product was a distillation cut boiling between 89° C. and 97° C. at 0.1 millimeter mercury pressure and was identified as the dimethyl, 1-methyl-3-oxo-1-butenyl ester of carbamic acid containing a minor amount of an unidentified impurity. Upon standing at 30° C. for several days, the product began to crystallize. The product was recrystallized from petroleum ether, the final product obtained being crystalline and melting at 48–49° C. Identification of the product was by elemental analysis and by infrared analysis. Elemental analysis showed: C, 57.3%; H, 7.3%; N. 7.9%. The analysis of the dimethyl, 1-methyl-3-oxy-1-butenyl ester of carbamic acid is: C, 57.2%; H, 7.6%; N, 8.2%.

*Example IV.—Preparation of Ethyl 3-(Dimethoxycarbamyloxy)Crotonate*

161 parts of dimethyl carbamyl chloride was added to a solution of 130 parts of acetoacetic ester in 158 parts of pyridine, the solution being cooled in an ice bath. Mole ratio: 1.5/1/2.0. The mixture was then allowed to stand at room temperature for two days. The mixture then was extracted with ether, and once with acetone. The solvent was removed to give a residual oil which was distilled to remove unreacted acetoacetic ester (53° C. at 0.5 millimeter mercury pressure). The residue then was distilled to give a product boiling at 85° C. at 0.05 millimeter mercury pressure. The product was analyzed: C, 53.6%; H, 8.1%; N, 6.6%. The analysis for ethyl-3-(dimethoxycarbamyloxy)crotonate is: C, 53.7%; H, 7.5%; N, 6.9%. Confirmation that the product was ethyl 3-(dimethoxycarbamyloxy)crotonate was made by infrared analysis.

*Example V.—Preparation of N,N-Dimethyl-3-(Dimethylcarbamyloxy)Crotonamide*

81 parts of dimethyl carbamyl chloride was added rapidly to a solution of 64.5 parts of dimethylacetoacetamide in 79 parts of pyridine. Mole ratio: 0.75/0.5/1.0. The mixture was heated on a steam bath (85° C.) for two hours. The mixture then was extracted with ether. The solvent was removed and the residue distilled to give a product boiling at 111–114° C. at 0.08 millimeter mercury pressure. Analysis: C, 53.5%; H, 8.5%; N, 14.1%. Analysis of N,N-dimethyl-3-dimethylcarbamyloxy)crotonamide: C, 54.0%; H, 8.5%; N, 14.0%. Confirmation that the product was the crotonamide was obtained by infrared analysis.

*Example VI.—Preparation of Ethyl Beta-(Dimethylcarbamyloxy)-p-Nitrocinnamate*

32.2 parts of dimethyl carbamyl chloride was added to a solution of 47.4 parts of ethyl p-nitrobenzoylacetate in 60 parts of pyridine. Mole ratio: 0.3/0.2/0.8. The mixture was heated at 80° C. for 20 hours, then was cooled and extracted with dry ether. The ether and excess reactants were stripped from the extract. The residue was distilled in a molecular still to give a product boiling at 170–173° C. at 1.5 microns pressure. Analysis: C, 53.9%; H, 5.8%; N, 9.0%. Analysis of ethyl beta-dimethylcarbamyloxy)-p-cinnamate: C, 54.5%; H. 5.2%; N, 9.1%. Infrared analysis confirmed that the product was the cinnamate.

*Example VII.—Preparation of Beta-(Dimethylcarbamyloxy)Cinnamonitrile*

55 parts of dimethylcarbamyl chloride, 50 grams of benzoylacetonitrile and 55 parts of pyridine (mole ratio: 0.51/0.34/0.70) were mixed, the mixture was warmed for one hour over a steam bath, then was allowed to stand overnight. The mixture was extracted with ether, the ether was evaporated from the extract and the residue from the extract distilled. The product boiled at 158° C. at 0.08 millimeter mercury pressure. Analysis: C, 66.6%; H, 6.3%; N, 12.6%. Analysis of beta-(dimethylcarbamyloxy)cinnamonitrile: C, 66.6%; H, 5.6%; N, 13.0%. Infrared analysis confirmed that the product was the cinnamonitrile.

*Example VIII.—Preparation of Methyl Beta-(Dimethylcarbamyloxy)Cinnamate*

A mixture of 89 parts of methyl benzoylacetate, 81 grams of dimethyl carbamyl chloride and 79 grams of pyridine (mole ratio: 0.5/0.75/1.0) was heated at 75° C. for 24 hours, then was allowed to cool to room temperature. 200 parts by volume of water were added and the aqueous mixture was extracted with ether. The ethereal extract was dried with sodium sulfate and the ether removed by distillation. The residue was then distilled to give a product boiling at 146–155° C. at 0.09 to 0.1 millimeter mercury pressure. Analysis: C, 62.3%; H, 5.9%; N, 5.3%. Analysis of methyl beta-(dimethylcarbamyloxy)cinnamate: C, 62.7%; H, 6.0%; N, 5.6%. Infrared analysis confirmed that the product was the cinnamate.

*Example IX.—Preparation of 3-(Dimethylcarbamyloxy)-2-Phenylcrotononitrile*

63.6 parts of 2-phenylacetoacetonitrile, 53.8 parts of dimethyl carbamyl chloride and 47.4 parts of pyridine (mole ratio: 0.4/0.5/0.6) were mixed and the mixture heated at 75° C. for three hours. Pyridine hydrochloride was filtered off. The residue was triturated with water and extracted with ether. The solvent was then distilled from the extract, and the residue of the extract was distilled to give a product boiling at 141–144° C. at 0.08 millimeter mercury pressure. Analysis: C, 68.4%; H, 6.3%; N, 12.1%. Analysis of 3-(dimethylcarbamyloxy)-2-phenylcrotononitrile: C, 67.8%; H, 6.1%; N, 12.2%. Infrared analysis confirmed that the product was the crotononitrile.

*Example X.—Preparation of Ethyl 2-(Dimethylcarbamyloxy)-1-Cyclopentene-1-Carboxylate*

62.4 parts of 2-carbethoxycyclopentanone, 53.8 parts of dimethyl carbamyl chloride and 47.4 parts of pyridine (mole ratio: 0.4/0.5/0.6) were mixed and the mixture heated at 75° C. for six hours. The cooled mixture then was triturated with water and extracted with ether. The ethereal extract was dried, the ether removed and the residue distilled to give a product boiling at 112–115° C. at 0.08 millimeter mercury pressure. Analysis: C, 57.8%; H, 7.6%; N, 6.3%. Analysis of ethyl 2-(dimethylcarbamyloxy)-1-cyclopentene-1-carboxylate: C, 58.1%; H. 7.5%; N. 6.1%. Infrared analysis confirmed that the product was the carboxylate.

*Example XI.—Preparation of 2-(Dimethylcarbamyloxy)-3-Methyl-2-Cyclopentene-1-One*

17 parts of 2-hydroxy-3-methyl-2-cyclopentene-1-one, 18 parts of dimethyl carbamyl chloride and 14 parts of pyridine (mole ratio: 0.15/0.17/0.3) were mixed and the mixture heated at 95° C. for 16 hours. The mixture then was extracted with ether, the ethereal extract was dried, the ether removed and the residue was chilled. A crystalline, tan-colored product melting at 55–56° C. was obtained. Analysis: C, 58.4%; H, 7.2%; N, 7.4%. Analysis of 2-(dimethylcarbamyloxy)-2-methyl-2-cyclopentene-1-one: C, 59.0%; H, 7.2%; N, 7.4%.

*Example XII.—Preparation of Ethyl Beta-(Dimethylcarbamyloxy)Cinnamate*

A mixture of 70 parts of ethyl benzoylacetate, 81 parts of dimethyl carbamyl chloride and 79 parts of pyridine (mole ratio: 0.36/0.75/1.0) was heated at 75° C. for twelve hours. The mixture then was extracted with ether, and the ether removed to give an oil. Fractionation of the oil gave a product boiling at 165–173° C. at 0.8 millimeter mercury pressure. Analysis: C, 63.9%; H, 6.8%; N, 4.9%. Analysis of ethyl beta-(dimethylcarbamyloxy)cinnamate: C, 63.9%; H, 6.5%; N, 5.3%. Infrared analysis confirmed that the product was the cinnamate.

Enol carbamates of this invention have been found to have very desirable characteristics as insecticides. The insecticidal properties of these carbamates are similar to those of pyrethrins—i.e., they have a very high knockdown activity with respect to houseflies and other flying insects. That is to say, a very low concentration of the carbamate causes a high percentage of the flies contacted therewith to become quickly immobilized. The carbamates also are highly toxic to flies, effecting a high permanent kill as well as quick knock-down.

Two subgenera of the enol carbamates of the invention are of particular interest because of insecticidal properties. These two subgenera are the esters of lower dialkyl carbamic acids with lower hydrocarbyl esters of the enol forms of beta-ketoacetic acids wherein the keto group is a lower alkanoyl group or is the benzoyl or a negatively substituted benzoyl group. These two subgenera can be described by the respective formulas:

(1) 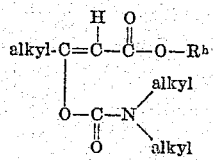

(2) 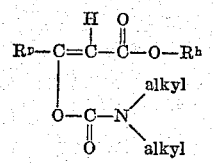

wherein "alkyl" is lower alkyl, preferably alkyl of from 1 to 6 carbon atoms, $R^h$ is "alkyl" or phenyl, and $R^p$ is the phenyl group, or a phenyl group substituted by one or more negative substituents, such as halogen (particularly chlorine), the nitro group or the like.

The high knockdown activity of these enol carbamates is demonstrated by the following tests and the results obtained therein. Corresponding data on commercial quick knockdown insecticides as Lethane 384 (active ingredient—beta-butoxy, beta'-thiocyano diethyl ether), Thanite (isobornyl thiocyanoacetate), and pyrethrin (pyrethrolone ester of chrysanthemummonocarboxylic acid) was obtained for comparison.

Common houseflies (*Musca domestica*) were subjected to a modification of the test described by Y. P. Sun, Journal of Economic Entomology, volume 43, pages 45 et seq. (1950). The test differed from that described by Dr. Sun only in that no food was given the flies after they were sprayed and the percent knockdown was determined 30 minutes after spraying. The results of these tests are summarized in Table I.

TABLE I

| Toxicant | Toxicant concentration (percent) | Percent knockdown in 30 minutes |
| --- | --- | --- |
| Methyl 3-(dimethylcarbamyloxy)crotonate | 0.5 | 100 |
| Ethyl 3-(dimethylcarbamyloxy)crotonate | 0.5 | 90 |
| Ethyl 3-(dimethylcarbamyloxy)cinnamate | 0.075 | 90 |
| Do | 0.1 | 100 |
| Methyl β-(dimethylcarbamyloxy)cinnamate | 0.1 | 90 |
| Ethyl β-(dimethylcarbamyloxy)-p-nitrocinnamate | 0.5 | 100 |
| Benzyl 3-(dimethylcarbamyloxy)crotonate | 0.5 | 90 |
| Do | 0.75 | 100 |
| β-(Dimethoxycarbamyloxy)cinnamonitrile | 0.4 | [1] 80 |
| Lethane 384 | 1.0 | 83 |
| Thanite | 1.0 | 80 |
| Pyrethrin | 0.2 | 99 |

[1] 10 minutes.

From this data, it is evident that the enol carbamates of this invention have knockdown properties which compare favorably—in some cases are superior to—the properties of well known quick knockdown insecticides.

The toxicity of the enol carbamates to insects is demonstrated by the following experiments and the results thereof.

Solutions of certain of the novel compounds of the invention were made up employing either a neutral petroleum distillate boiling within the kerosene range or acetone as the solvent. The solutions were tested for toxicity against the 2-spotted spider mite, *Tetranychus telarius*, and the pea aphid, *Macrosiphum pisi*, by spraying groups of plants infested with the insects under controlled conditions which varied from one test to the other only with respect to the identity of the toxic agent and its concentration. Thus, in each of the several tests, the same total volume of spray was used. Also, tests were carried out using the common housefly, *Musca domestica*, as the test insect, the method used being that described by Y. P. Sun, Journal of Econ. Entomology, volume 43, p. 45 et seq. (1950). Table II shows the concentration of active agent in the sprayed solution required to cause approximately 50 percent mortality of the test insect—i.e., the $LD_{50}$ concentration.

It is evident from these test results that the enol carbamates are quite toxic to a variety of insects.

TABLE II

| Test insect | Approximate median lethal concentration ($LD_{50}$), g. per 100 ml. solvent | | |
| --- | --- | --- | --- |
| | Pea aphid | 2-spotted spider mite | Housefly |
| Material: | | | |
| Methyl 3-(dimethylcarbamyloxy)crotonate | 0.08 | >0.4 | 0.31 |
| Ethyl 3-(dimethylcarbamyloxy)crotonate | >0.4 | >0.4 | 0.35 |
| Ethyl 3-(dimethylcarbamyloxy)cinnamate | 0.023 | 0.37 | 0.06 |
| Methyl β-(dimethylcarbamyloxy)cinnamate | 0.025 | | 0.05 |
| Ethyl β-(dimethylcarbamyloxy)-p-nitrocinnamate | 0.068 | 0.4 | 0.22 |
| β-(Dimethoxycarbamyloxy)cinnamonitrile | 0.023 | >0.4 | 0.31 |

It has further been found that strains of flies which are highly resistant to the effect of chlorinated insecticides are as readily killed by the enol carbamates as are the flies which are not resistant to chlorinated insecticides. Thus, a typical species of these enol carbamates, ethyl 3-(dimethylcarbamyloxy)cinnamate, was tested against a strain of the common housefly (*Musca domestica*), about 1000 times more resistant to dieldrin than a non-resistant strain, and against a non-resistant (normal) strain. The results are set out in Table III.

TABLE III

| Concentration of toxicant (percent) | Mortality (percent) | |
| --- | --- | --- |
| | Resistant housefly | Normal housefly |
| 0.05 | 86 | 99.7 |
| 0.1 | 97 | 99.7 |
| 0.2 | 100 | 100 |

These enol carbamates thus are highly toxic to insects. By the term "insects" is meant not only the members of the class Insecta, but also similar non-vertebrate animal organisms belonging to allied classes of arthropods, and including mites, ticks, spiders, wood lice, and the like. These enol carbamates are particularly effective for destruction of flies, gnats, mosquitoes and other insect pests found in and around barnyards, stables, milking sheds, swampy lands, drainage ditches, irrigation ditches and the like.

These insecticidally active enol carbamates can be employed for insecticidal purposes by the use of any of the methods which are conventionally employed in that art. For example, the active compounds can either be sprayed or otherwise applied in the form of a solution or dispersion, or they can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenolethylene oxide condensates, and ammonium salts, and the like. These solutions can be employed as such, or, more preferably, they can be dispersed or emulsified in water and the resulting aqueous dispersion or emulsion applied as a spray. The compositions may also contain sticking agents, emulsifying agents or other materials which enhance the effectiveness of the toxic materials. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint.

When employed as an insecticide, a compound of this invention can be employed either as the sole toxic ingredient of the insecticidal composition or can be employed in conjunction with other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl - p - nitrophenyl thiophosphate, aldrin, dieldrin, azobenzene and the various compounds of arsenic, lead, and/or fluorine.

Further, it has been found that the insecticidal activity of enol carbamates of this invention are increased synergistically by incorporation therewith of a small amount of a compound containing the structural configuration

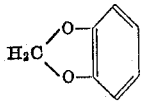

Of these, it has been found that compounds having the following structural formula are most effective

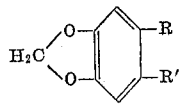

In this formula, R may represent a straight chain, branched chain or cyclic alkyl group preferably of 1 to 20 carbon atoms, either saturated or unsaturated. R may also represent a carboalkyl group that is a group containing one or more

alkyl groups. R may also represent a carboalkoxy group, i.e., a group containing one or more

alkyl groups. R also encompasses alkyl sulfoxy groups, i.e., groups containing one or more $$-\overset{O}{\underset{\|}{S}}-$$

alkyl groups. When R is carboalkyl, carboalkoxy or alkyl sulfonyl, the alkyl portion is straight chain, branched chain or cyclic alkyl preferably of 1 to 20 carbon atoms, either saturated or unsaturated.

R' is a hydrogen atom or a group of the type defined for R. R and R' when taken together represent a cyclic alkyl, carboalkyl, carboalkoxy, or alkyl sulfoxy group preferably of 1 to 20 carbon atoms, either saturated or unsaturated. The structures of specific synergists of this class include those of the structures:

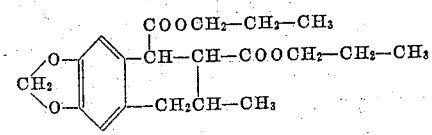

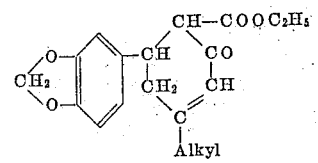

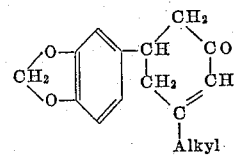

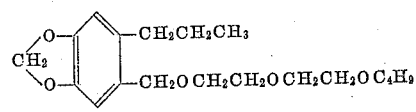

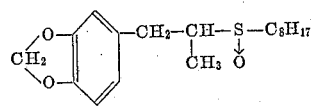

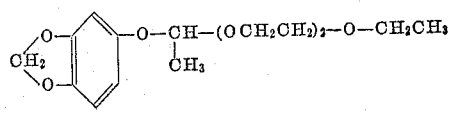

The last of the structures shown, namely 2-(2-ethoxyethoxy)ethyl 3,4-methylenedioxyphenyl acetal of acetaldehyde, is the preferred synergist.

The synergistic activity of 2-(2-ethoxyethoxy)ethyl 3,4-methylenedioxyphenyl acetal of acetaldehyde is illustrated by Table IV, giving the results of tests against the housefly, *Musca domestica*. The first column of figures shows the number of times the insecticidal activity of each enumerated compound is increased by the addition of 2-(2-ethoxyethoxy)ethyl 3,4-methylenedioxyphenyl acetal of acetaldehyde. The second column of figures shows the $LD_{50}$ of each of the compounds tested without synergist, and the figures in the third column show the $LD_{50}$ with the presence of synergist.

TABLE IV

| Compound | Increase in toxicity with 1% 2-(2-ethoxyethoxy)ethyl 3,4-methylenedioxyphenyl acetal of acetaldehyde (number of times) | LD$_{50}$ Without 2-(2-ethoxyethoxy)ethyl 3,4-methylenedioxyphenyl acetal of acetaldehyde | LD$_{50}$ With 2-(2-ethoxyethoxy)ethyl 3,4-methylenedioxyphenyl acetal of acetaldehyde |
|---|---|---|---|
| Ethyl 3-(dimethylcarbamyloxy) cinnamate | 12.8 | 0.060 | 0.0047 |
| Methyl 3-(dimethylcarbamyloxy) crotonate | 5.7 | 0.31 | 0.054 |
| Ethyl 3-(dimethylcarbamyloxy) crotonate | 4.7 | 0.35 | 0.025 |
| Benzyl 3-(dimethylcarbamyloxy) crotonate | 6.5 | 0.41 | 0.063 |

The extraordinary synergistic properties of the preferred insecticidal compositions of the present invention are immediately apparent from the figures in column one. Toxicity of insecticidally active vinyl esters of pentavalent phosphorus acids has been increased as much as thirteen times by the addition of 2-(2-ethoxyethoxy)ethyl 3,4-methylenedoxyphenyl acetal of acetaldehyde.

The concentration of the synergist employed in the insecticidal mixture may vary considerably. Thus, the synergists of the present invention may be present in less than 1% and may, if desired, be employed in concentrations in excess of 10% by weight of the insecticidal composition. Approximately 1% by weight of the synergist in the insecticidal composition is preferred.

The enol carbamate-synergist compositions of this invention can be employed for insecticidal purposes by the use of any of the methods which are conventionally in the art and which have already been described herein with respect to the use of the enol carbamates of this invention alone as the insecticide.

Enol carbamates of the invention have been found to be herbicidally active, the herbicidal activity of a typical species of these carbamates having been established as follows:

Beta-(dimethylcarbamoyloxy)cinnamonitrile was shown to act as a pre-emergence herbicide giving weed control without residual toxicity to crops. The compound was applied by spraying on ten square feet of freshly prepared soil naturally infested with weed seeds. Application was made by spraying an acetone solution of the compound at the rate of 20 pounds of the compound per acre. 95% control of the weeds was obtained. No residual toxicity to the crop later planted was noted.

The herbicidal properties of these enol carbamates are exploited by the usual procedures known in the art. According to the intended method of application and the character of the plants involved, the active ingredient can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier. Where a light hydrocarbon oil is to be used as carrier, suitable materials for the purpose include any of the spray oils marketed commercially for this purpose. The highly aromatic hydrocarbons are preferred.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X–100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of the herbicidal enol carbamates suitable for application to plants or to their environment contain the active agent or agents in concentrations generally within the range of from about 0.01% by weight to about 25% by weight.

The active agent or agents may be absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 50% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.5 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain one or more of the herbicidal enol carbamates set out hereinbefore as the sole active agent, or they may contain in addition thereto other biologically active substances. Other plant regulators, such as naphthalene acetic acid, 2,4-dichlorophenoxyacetic acid and the like, as well as insecticides, e.g., DDT, endrin, dieldrin, aldrin, chlordaine, systox, methoxychlor, rotenone and pyrethrum, and fungicides, such as copper compounds, ferbam, captan, and the like, may if desired, be incorporated in the compositions.

Enol carbamates of this invention have been found to be effective fungicides especially for use in soil, as shown by the following tests of a typical species of the enol carbamates:

3 - (dimethylcarbamyloxy)-2-phenylcrotononitrile was found to be active as a soil fungicide for the control of seedling rot of peas caused by *Fusarium solani* and *Pythium ultimum*. In this test screened Fresno sandy loam soil naturally infested with the two organisms was treated with an aqueous acetone solution of the chemical, and complete control of pre- and post-emergence attack without significant phytotoxicity was demonstrated at approximately 300 parts per million concentrated in the soil.

The fungicidal properties of the enol carbamates are exploited by the usual procedures known in the art. An excellent summary of current practice in the use of soil fungicides is set out in U.S. Patent No. 2,840,501. The fungicidally effective dosage of the enol carbamate varies from species to species. In general, however, a dosage of from about 50 to about 1000 parts by weight of the enol carbamate per million parts by weight of the soil or other growth media, will be found effective, with dosages of about 100 to about 500 parts per million in the same basis being most effective.

We claim as our invention:

1. As a new compound, the ester of a carbamic acid having the formula:

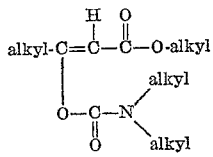

wherein "alkyl" is lower alkyl.

2. As a new compound the ester of a carbamic acid having the formula:

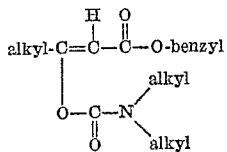

wherein "alkyl" is lower alkyl.

3. As a new compound, the ester of a carbamic acid characterized by the structural formula:

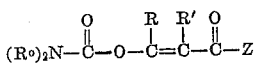

wherein R° and R' each represents a member of the group consisting of hydrogen, and organic radicals containing up to 10 carbon atoms of the group consisting of alkyl, cycloalkyl, phenyl, alkyl-substituted phenyl, phenyl-substituted alkyl, and such radicals substituted by from one to a plurality of substituents from the group consisting of halogen, cyano and nitro, R represents an organic radical of the group represented by R° and R', and Z represents a member of the group consisting of the hydroxy group, and the groups represented by R—O— and (R°)$_2$N—, with the proviso that the symbols R and R' together can represent an alkylene radical of up to six carbon atoms and with the proviso that the symbols R° together can represent an alkylene radical of up to six carbon atoms.

4. As a new compound, the ester of a carbamic acid characterized by the structural formula:

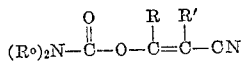

wherein R° and R' each represents a member of the group consisting of hydrogen, and organic radicals containing up to 10 carbon atoms of the group consisting of alkyl, cycloalkyl, phenyl, alkyl-substituted phenyl, phenyl-substituted alkyl, and such radicals substituted by from one to a plurality of substituents from the group consisting of halogen, cyano and nitro, R represents an organic radical of the group represented by R° and R', with the proviso that the symbols R and R' together can represent an alkylene radical of up to six carbon atoms and with the proviso that the symbols R° together can represent an alkylene radical of up to six carbon atoms.

5. As a new compound, the ester of a carbamic acid having the formula:

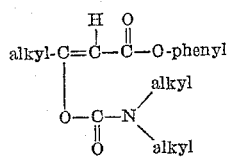

wherein "alkyl" is lower alkyl.

6. As a new compound, the ester of a carbamic acid having the formula:

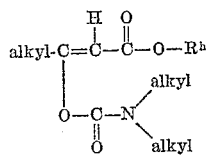

wherein "alkyl" is lower alkyl, and $R^h$ represents a phenyl radical substituted by at least one of halogen, nitro and cyano.

7. As a new compound, the ester of a carbamic acid having the formula:

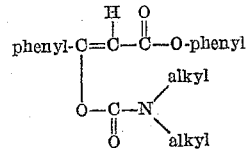

wherein "alkyl" is lower alkyl.

8. As a new compound the ester of a carbamic acid having the formula:

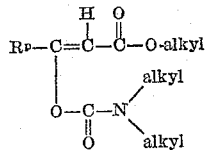

wherein "alkyl" is lower alkyl, and $R^p$ is a phenyl radical substituted by at least one of halogen, nitro and cyano.

References Cited in the file of this patent

UNITED STATES PATENTS 2,592,890    Gysin  ---------------- Apr. 15, 1952

FOREIGN PATENTS 1,054,987    Germany  ------------ Jan. 11, 1957